UNITED STATES PATENT OFFICE.

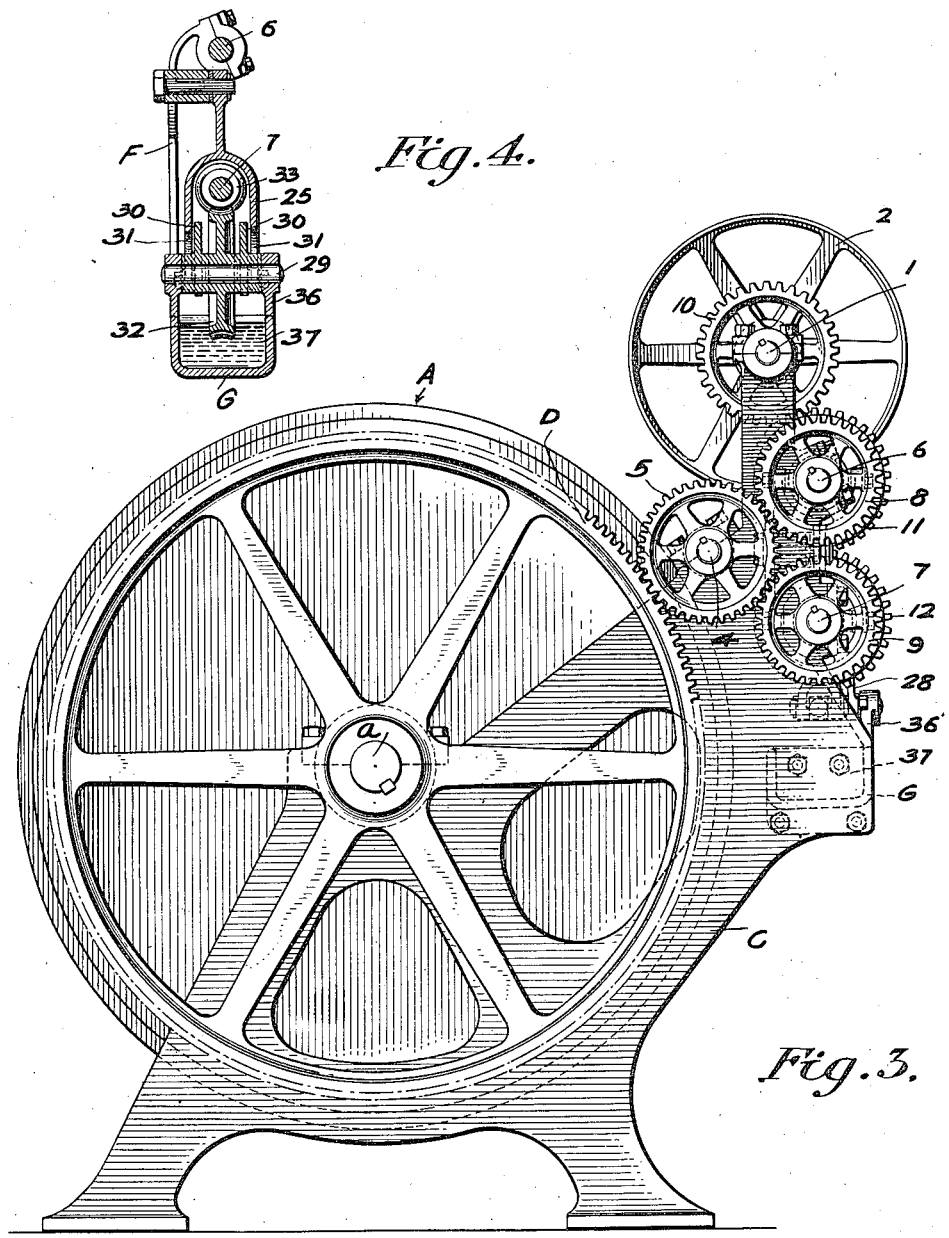

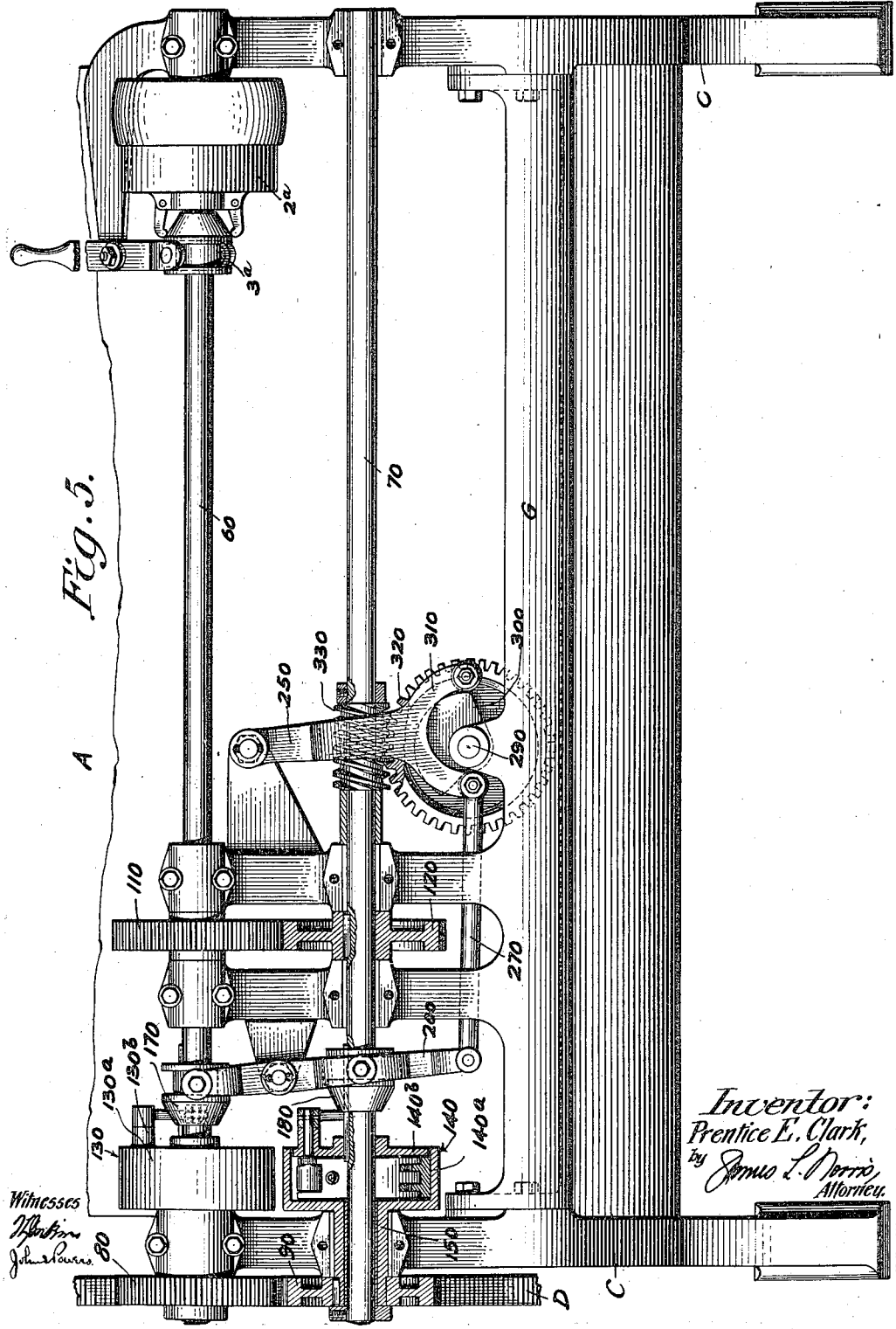

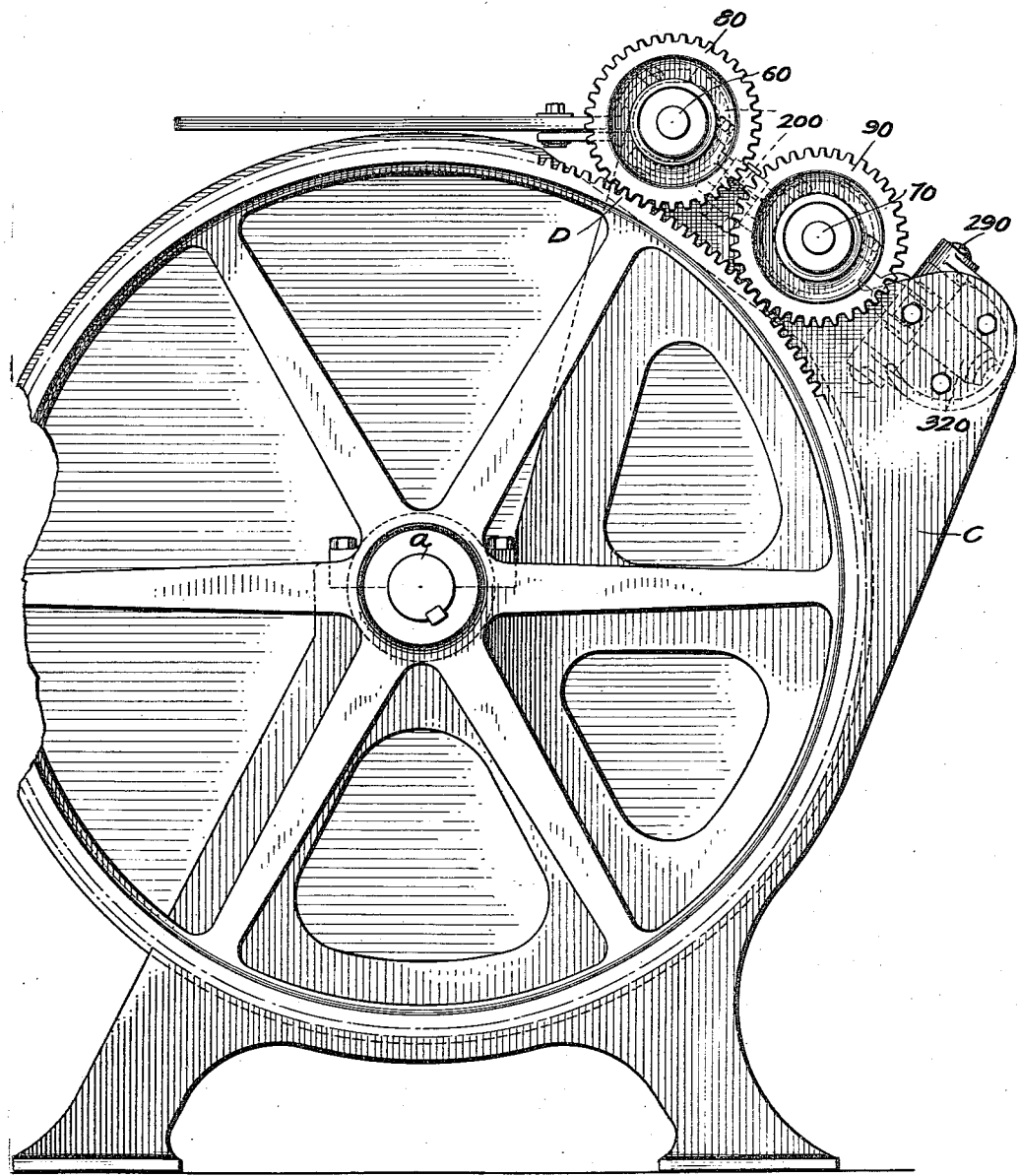

PRENTICE E. CLARK, OF ELKINS, WEST VIRGINIA.

TRANSMISSION-GEARING.

1,272,218.  Specification of Letters Patent.  Patented July 9, 1918.

Application filed August 20, 1917. Serial No. 187,167.

*To all whom it may concern:*

Be it known that I, PRENTICE E. CLARK, a citizen of the United States, residing at Elkins, in the county of Randolph and State of West Virginia, have invented new and useful Improvements in Transmission-Gearing, of which the following is a specification.

This invention relates to improvements in transmission gearing for converting continuous rotary motion into alternating rotary motion, and it proposes a construction which is especially applicable in an organization such as is shown in my United States Letters Patent No. 969,601 of September 6, 1910, as a transmission unit between the continuously rotary main driving shaft and each of the machines operated thereby.

The present invention proposes transmission gearing which is of special advantage in the operation of washing machines of the type used in commercial laundries wherein a horizontal cylindrical container is rotated several revolutions, first in one direction and then in the other.

The principal objects of the invention are to provide transmission gearing for the purpose stated which shall effect an economy in power, which shall operate with a minimum of noise and loose play, which shall not be subject to derangement and shall have highly effective wear resisting property, in which the shock incident to the reversal of rotation of the driven machine, e. g., a washing machine, shall be reduced to a minimum and rendered without destructive effect, and which shall be simple and compact in its structure and organization and may be manufactured at relatively low cost.

Further objects of the invention are to provide transmission gearing for the purpose stated in which all bevel gears are eliminated, a direct application of power, for the drive in either direction, is made to the large gear on one of the machine trunnions, and long and sturdy bearings may be employed for the various pinion hubs or shafts.

With the above objects in view, the invention consists of certain novel features of structure, combination and relation which will be set forth in detail as the description proceeds.

Washing machines of the type above referred to, if of relatively great length, have driving power applied at both ends thereof and if of relatively short length have driving power applied at but one end thereof. In the accompanying drawings, I have illustrated two embodiments of the invention, the first of which is adapted for the application of driving power to both ends of a washing machine and the second of which is adapted for the application of driving power to but one end of a washing machine.

In the said drawings:

Fig. 3 is an elevation of the left end of the machine and gearing, Fig. 1 of the drawing being considered.

Fig. 4 is a detail cross-sectional view on the line 4—4 of Fig. 2.

Fig. 5 is a plan view of gearing, in accordance with the present invention, adapted to the application of driving power to but one end of the machine. In this view certain parts are shown in section.

Fig. 6 is a view in elevation of the left end of the machine and gearing, Fig. 4 of the drawing being considered.

Similar characters of reference designate corresponding parts throughout the several views.

Figure 1:
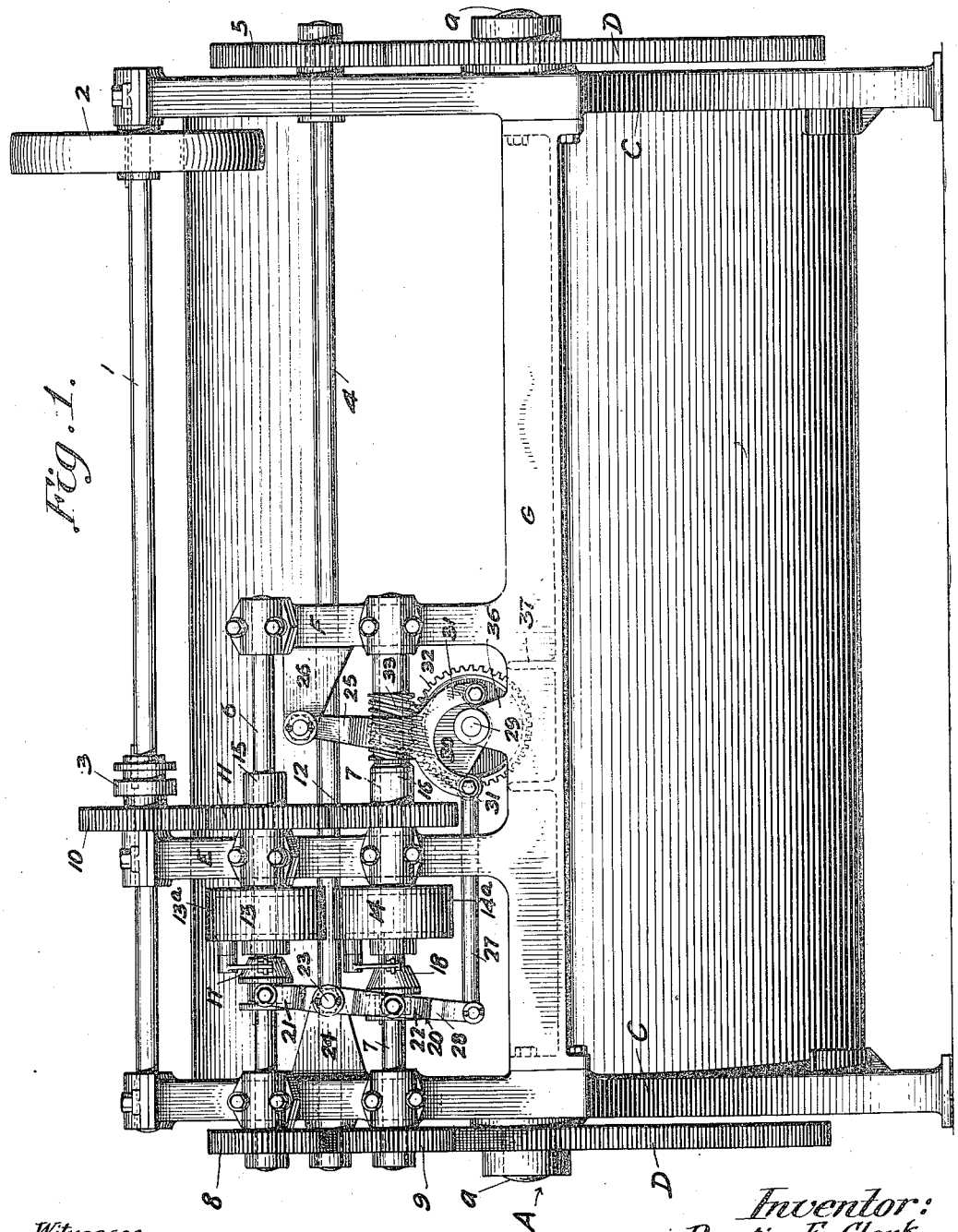
Figure 1 is a front elevation of a washing machine and gearing, in accordance with the present invention, for driving said machine by the application of power to both ends thereof.

The gearing is shown in its application to a washing machine A as a transmission unit between such machine and the line shaft (not shown) which rotates continuously in one direction, the arrangement of the washing machines in tandem and their relation to the line shaft being as disclosed in my said Letters Patent No. 969,601.

Referring to Figs. 1 to 4:

The line shaft if desired can be directly geared to the gearing which constitutes the present invention but instead of this it is preferred to provide between said shaft and each machine to be driven an intermediate shaft 1, parallel to the pivotal axis of the machine A and which is connected by belt or other suitable gearing 2 to the line shaft and is driven therefrom continuously in one direction.

The washing machine A has end trunnions *a* which have their bearings in end supporting frames C and are provided with large spur wheels D. The machine A is directly driven by a reversible longitudinal shaft 4 which is provided at its ends with pinions 5 in mesh with the spur wheels D. The shaft 4, in turn, is driven alternately from longitudinal shafts 6 and 7 which rotate in opposite directions and are provided with pinions 8 and 9, respectively, both in mesh with one of the pinions 5.

The shafts 6 and 7 are driven from the shaft 1, the gearing including a pinion 10 on the shaft 1 and pinions 11 and 12 loose on the respective shafts 6 and 7, the pinion 11 being driven by the pinion 10 and in turn driving the pinion 12.

In order that each machine may be independently controlled whereby the operation of any particular machine may be discontinued without affecting the operation of the remaining machines a suitably manually operated clutch 3 is provided. The clutch 3 is shown in association with the pinion 10 which is preferably loose on the shaft 1, thus enabling the pulley of the gearing 2 to be set at any desired position on said shaft.

The pinions 11 and 12 are adapted to be clutched to the respective shafts 6 and 7 to enable either shaft to effect the operation of the machine. The clutches for the respective pinions 11 and 12 are indicated generally by the numerals 13 and 14 and may be of any suitable construction. Said clutches include elements 13ª and 14ª which are fast with the respective pinions 11 and 12 but are loose on the shafts 6 and 7 and companion elements 13ᵇ and 14ᵇ respectively which are fast with the shafts 6 and 7 to effect their rotation. As shown and preferred, the pinion 11 and clutch element 13ª are mounted on a sleeve 15 and the pinion 12 and clutch element 14ª are similarly mounted on a sleeve 16.

When the elements of either clutch are engaged the elements of the other clutch must be disengaged; and the reversal of the rotation of the machine A is effected by changing the drive from one clutch to the other whereby the said machine will be driven alternately and in opposite directions by the respective shafts 6 and 7. The operations of the clutches 13 and 14 are controlled by elements 17 and 18 which are slidable on the respective shafts 6 and 7. In Fig. 1, I have illustrated clutches of well-known construction wherein transversely movable levers 19 are employed to effect the engagement of the companion clutch elements and the elements 17 and 18 have conical working faces to engage and operate said levers. The elements 17 and 18 are operated by a lever 20 which has yokes 21 and 22 associated with said respective elements, the lever 20 being pivoted as at 23 between the yokes 21 and 22 to a supporting bracket 24. It will be obvious that by moving the lever 20 about its pivot the clutch operating elements 17 and 18 will be moved in opposite directions whereby one clutch will be rendered operative and the other clutch will be rendered inoperative and by reversing the movement of the lever 20 the operative and inoperative relation of the respective clutches will be reversed.

The movements of the lever 20 are effected automatically, the gearing for this purpose including an oscillatory lever 25 which is pendent from a bracket 26 to which it is pivoted and which, at its lower end, is connected by a link or links 27 to a downward extension 28 of the lever 20, the said extension being located below the yoke 22. For the operation of the lever 25 a transverse shaft 29 is provided, said shaft having cams 30 which coöperate with longitudinally disposed yoke arms 31 formed at the lower end of the lever 25. There are preferably two pairs of oppositely located yoke arms 31 and two cams 30 for coöperation with the yoke arms of the respective parts, although, if desired, a single pair of yoke arms 31 and a single cam 30 may be employed. The links 27 above mentioned are connected to the yoke arms which are located nearest to the lever 20. As shown, the shaft 29 is driven from the pinion 12, worm gearing being employed which comprises a worm wheel 32 fast on the shaft 29 and a worm 33 which loosely surrounds the shaft 7 and is rotatable with the sleeve 16 to which it is connected as by coupling screws 35.

The pinion 12 is continuously rotated in one direction and by means of the worm 33 and worm wheel 32 effects a continuous rotation of the shaft 29. The cams 30 on said shaft are formed to quickly shift the lever 25 in either direction and to hold said lever for a suitable interval in its extreme positions. In such extreme positions of the lever 25 one or the other of the clutches has its elements in engaged relation and the shaft, 6 or 7, as the case may be, which is controlled by said clutch is thereby effective to rotate the driven machine for such an interval of time as may be permitted by the cams 30.

Figure 2:
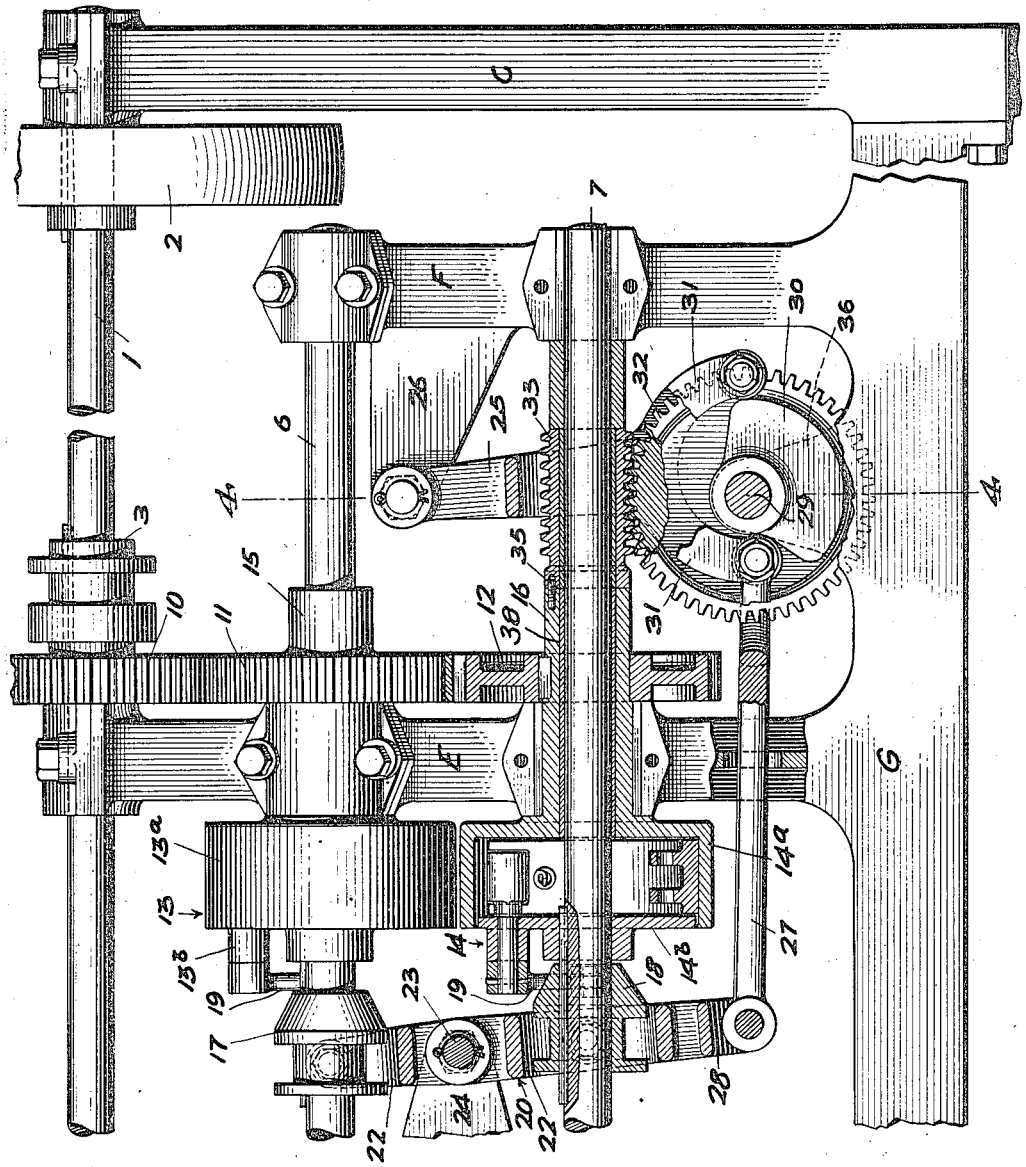
Fig. 2 is an enlarged front elevation and partial sectional view of the gearing.

Fig. 2 assumes an operation of the machine by the shaft 6 and shows the clutch operating element 17 in a position wherein the elements of the clutch 13 are engaged. In such a case the pinion 8 drives the machine A and the pinion 9 and shaft 7 run idle in a direction counter to the rotation of the pinion 12. In due course the lever 20 is operated to provide for the disengagement of the elements of the clutch 13 and the engagement of the elements of the clutch 14. Thereupon the machine A is driven from the shaft 7 and pinion 9 in a direction reverse to that in which it was previously driven by the shaft 6 and pinion 8. When the machine A is driven by the pinion 9 the pinion 8 and shaft 6 run idle in a direction counter to the rotation of the pinion 11.

The end frames C are formed with bearings for the shafts 1 and 4 and that frame C which adjoins the pinions 8 and 9 is also formed with bearings for the shafts 6 and 7. Between the end frames C upright standards E and F are provided, said standards being formed with bearings for the shafts 4, 6 and 7 and the standard E being preferably formed with an intermediate bearing for the shaft 1. The standards E and F are preferably formed integral with a longitudinal reinforcing bar G which extends between and is secured at its ends to the end frames C. The bar G is provided with bearings 36 for the transverse shaft 29 and also with an oil containing receptacle 37 within which the worm wheel 32 projects.

To reduce friction bearing sleeves are interposed between the pinions 11 and 12 and the respective shafts 6 and 7, such a sleeve, as 38, being shown in Fig. 2 as arranged between the pinion 12 and shaft 7.

Referring to Figs. 5 and 6:

The transmission gearing shown in these figures is adaptable to a relatively short machine having a spur pinion D at but one end thereof. In this construction the intermediate shaft 4 and pinions 5 as above described, are not employed, and the machine is driven directly and in alternation from shafts 60 and 70 which correspond generally to the respective shafts 6 and 7 of the previously described embodiment. The shaft 60 is driven directly from the line shaft and in this respect serves the purpose of the shaft 1 in the previously described embodiment. Belt or other gearing 2ª is provided for the operation of the shaft 60 and its operation is controlled by a clutch 3ª. The shaft 60 rotates continuously in one direction and drives the shaft 70 continuously in an opposite direction. For this purpose the shafts 60 and 70 have fast thereon intermeshing pinions 110 and 120 respectively which correspond, in function, to the pinions 11 and 12 in the previously described embodiment.

For the operation of the machine A the shafts 60 and 70 drive pinions 80 and 90 respectively. The pinions 80 and 90 correspond in function to the pinions 8 and 9 of the previously described embodiment but are in direct engagement with the spur wheel D and are loosely mounted on the respective shafts 60 and 70.

The operation of the machine A from the shafts 60 and 70 is controlled by suitable clutches 130 and 140 which correspond in function to the clutches 13 and 14 of the previously described embodiment. In the present construction, however, the members 130ª and 140ª of said clutches which are loose on the respective shafts 60 and 70 are fast with the respective pinions 80 and 90 by virtue of connecting sleeves 150. The members 130ᵇ and 140ᵇ of the respective clutches and which are fast on the respective shafts 60 and 70 are operated to engage or disengage their companion members by suitable operating elements 170 and 180 which are slidable on the respective shafts 60 and 70 and whose operation is effected by a lever 200, the elements 170 and 180 and lever 200 corresponding in function to the elements 17 and 18 and the lever 20 of the previously described embodiment and the lever 200 resembling said lever 20 in structure and operation.

The operation of the lever 200 to shift the clutch operating elements 170 and 180 is effected in the same manner and by the same mechanism as that of the lever 20 of the previously described embodiment. Thus, the lever 200 is connected by links 270 to a pendent oscillatory lever 250 terminating at its lower end in yoke arms 310 which are engaged by operating cams 300 mounted on a transverse shaft 290, the said shaft being provided with a worm wheel 320 which is driven by a worm 330 fast on the shaft 70.

Fig. 5 assumes the operation of the machine A by the shaft 60. In such a case the clutch 130 drives the machine A through the pinion 80 and the pinion 90 runs idle, deriving its idle movement from the spur wheel D. In due course the elements of the clutch 130 are disengaged and at the same time the elements of the clutch 140 are engaged. Thereupon the machine A is driven from the shaft 70 through the clutch 140 and pinion 90 and the pinion 80 runs idle, deriving its idle movement from the spur wheel D.

While gearing in accordance with the invention is especially adapted for use as a transmission unit between the main or line shaft and each machine and has been described as applied to such use, it will be understood that said gearing may, with advantage, be used for the operation of all the machines in the gang in accordance with the system of machine operation disclosed in my Letters Patent No. 951055, granted March 1, 1910, wherein a single reversing gearing is employed and all of the machines are simultaneously reversed by said gearing, in case such a system of operation may be desired.

Having fully described my invention, I claim:—

1. In transmission gearing of the type set forth, in combination, a pair of parallel shafts, a pair of intermeshing pinions mounted on the respective shafts, one of said pinions being continuously driven in one direction and continuously driving the other in an opposite direction, a pair of machine driving pinions also mounted on the respective shafts, the pinions of one of said pairs being loose on the shafts and the pinions of the other pair being fast thereon, clutches associated with the loose pinions and operative to effect their rotation with the respective shafts, sleeves connecting said loose pinions and the respective companion elements of said clutches, supporting bearings for said sleeves, said loose pinions being arranged at one side and said clutches at the opposite side of said bearings, a worm mounted on one of said shafts and rotatable with and by the pinion thereon continuously driven in one direction, a shaft disposed transversely of said parallel shafts, a worm wheel on the transversely disposed shaft in mesh with and operated by said worm, a cam on the transversely disposed shaft and means for holding the respective clutches simultaneously operative and inoperative, said cam operating said means to reverse the clutches periodically in their operative and inoperative relation.

2. In transmission gearing of the type set forth, in combination, a pair of parallel shafts, a pair of intermeshing pinions loosely mounted on the respective shafts, one of said pinions being continuously driven in one direction and continuously driving the other in an opposite direction, a pair of machine driving pinions mounted fast on the respective shafts, clutches associated with the loosely mounted pinions and operative to effect their rotation with the respective shafts, a worm connected to the hub of one of the loosely mounted pinions, a shaft disposed transversely of said parallel shafts, a worm wheel on the transversely disposed shaft in mesh with and operated by said worm, a cam on the transversely disposed shaft, a lever connected to and pivotally mounted between the movable elements of said clutches, said lever serving to hold the respective clutches simultaneously operative and inoperative, a second lever provided with a terminal yoke whose arms straddle said cam, the latter effecting oscillatory movement of said second lever, and a link connecting said levers whereby said cam is effective to shift said first-named lever and to reverse the clutches periodically in their operative and inoperative relation.

In testimony whereof I have hereunto set my hand in presence of two subscribing witnesses.

PRENTICE E. CLARK.

Witnesses:
D. V. MEYER,
WAYNE JACKSON.